| United States Patent [19] | [11] | 4,076,067 |
|---|---|---|
| Gill | [45] | Feb. 28, 1978 |

[54] ELASTIC WHEEL WELL FILLER

[75] Inventor: Michael L. Gill, Akron, Ohio

[73] Assignee: The Goodyear Tire & Rubber Company, Akron, Ohio

[21] Appl. No.: 663,514

[22] Filed: Mar. 3, 1976

[51] Int. Cl.² ............................................. B60C 15/02
[52] U.S. Cl. ................................ 152/381.6; 152/379.1
[58] Field of Search ............ 152/379 R, 379 S, 381 R, 152/381 A, 158

[56] References Cited

U.S. PATENT DOCUMENTS

| 2,224,066 | 12/1940 | Shore | 152/158 |
| 3,884,286 | 5/1975 | Verdier | 152/379 R |

FOREIGN PATENT DOCUMENTS

| 1,172,562 | 6/1964 | Germany | 152/381 A |
| 2,513,826 | 9/1975 | Germany | 152/379 R |

*Primary Examiner*—Drayton E. Hoffman

*Attorney, Agent, or Firm*—F. W. Brunner; Frank Pincelli; Frederick K. Lacher

[57] ABSTRACT

A flexible elastic ring having a generally rectangular cross section with radially inner and outer surfaces. A plurality of rigid members are molded in the ring at circumferentially spaced-apart positions and each of the rigid members extends diagonally from an edge at the radially inner surface to an edge at the radially outer surface of the elastic ring. The ring is mounted in a wheel well of the tire rim with the tire bead overlapping the edge at the radially outer surface to hold down the ring and the ends of the rigid members in that edge. The other ends of the rigid members are located in the edge at the radially inner surface of the ring adjacent a radially extending side surface of the ring for resisting deflection of the side surface which abuts a radially extending surface of the wheel well. The rigid members prevent the ring from rotating out of the wheel well in this manner when the ring is subject to centrifugal force during rotation of the wheel on which the rim is mounted.

9 Claims, 4 Drawing Figures

ELASTIC WHEEL WELL FILLER

This invention relates generally, as indicated, to a wheel well filler mounted in a wheel well of a rim to prevent tire beads from entering the wheel well and being forced off the rim when the tire is operated in a deflated condition.

Heretofore, wheel well fillers and covers have been proposed and one of the most desirable forms of fillers is an elastic ring which can be stretched over the flanges of the rim and resiliently pulled into position in the wheel well. With an elastic ring, some provision is needed to retain the filler in the well because if the filler is elastic enough to stretch over the rim flanges, it is also elastic enough to expand under centrifugal force during operation of the tire. Placing the filler beneath the bead portion of the tire has not been satisfactory because the elastic wheel well filler does not provide a firm concentric surface for the bead to sit on and therefore the ride provided by the tire is adversely affected.

It has also been proposed to locate the wheel well filler in a well close to but not completely under the bead of a tire so that the bead will be seated in a seating area on the rim with only the toe of the bead overlapping the wheel well filler. In this way, the filler is retained in the well during operation of the tire and the bead is seated on a firm concentric surface of the rim. There is the problem, however, of the sidewall of the ring deflecting and permitting the filler to rotate under centrifugal force out of the well. To prevent this, a larger portion of the bead may be extended over the filler; however, this will reduce the seating area on the firm concentric surface of the rim which is not desirable.

With the foregoing in mind, it is the principal object of this invention to provide an elastic wheel well filler having circumferentially spaced-apart retainer members for preventing rotation of the filler out of the wheel well when subject to centrifugal force.

Another object is to provide a wheel well filler ring which only requires a minimum of overlapping by the toe of the bead for retention in the wheel well.

Still another object of the invention is to provide a continuous elastic flexible wheel well filler ring with retainer members which may be stretched over the rim flanges and mounted in the wheel well under tension.

A further object of the invention is to provide rigid retainer members molded in the filler ring and extending diagonally from a position under the toe of the tire bead to a position adjacent a side surface of the filler ring to limit the deflection of the side surface.

A still further object of the invention is to provide retainer members having a flat portion at the end located under the toe of the tire bead to obtain an effective pivot of the retainer member which is close to the edge of the toe of the overlapping tire bead.

Another object of the invention is to provide retainer members having a bent portion at the end adjacent the side surface of the filler ring to provide a greater bearing surface to resist deflection of the filler ring at the side surface.

Still another object of the invention is to provide a wheel well filler having a generally rectangular cross section for closely fitting in a channel-shaped wheel well with the rigid retainer members extending diagonally from a position adjacent the edge where two surfaces intersect to the other edge where the other two surfaces intersect to resist deflection and rotation of the filler well ring out of the wheel well.

These and other objects of the present invention may be achieved by a wheel well filler having a plurality of rigid retainer members molded in the wheel well filler at circumferentially spaced-apart positions and extending diagonally from a position under the overlapping toe of a tire bead portion to a position adjacent the side surface of the filler ring.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

Figure 1:
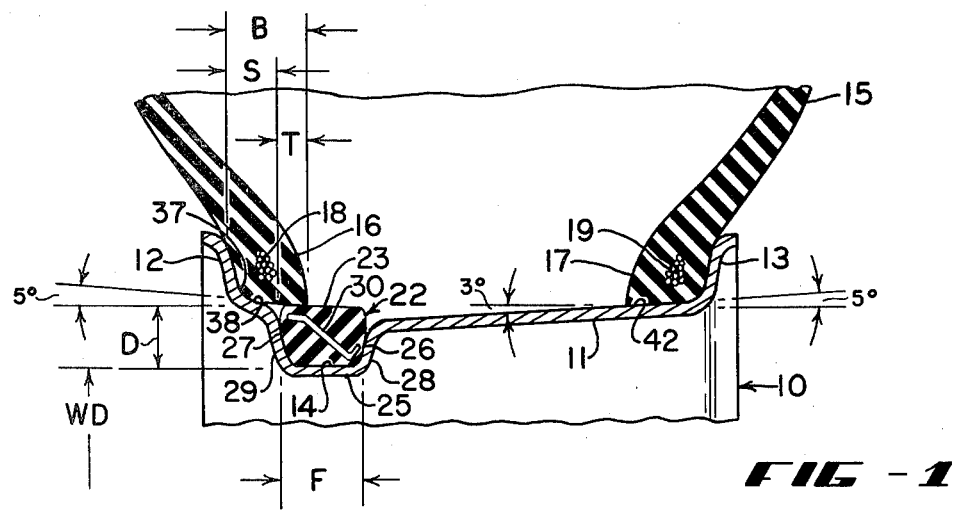
FIG. 1 is a fragmentary transverse sectional view showing the preferred embodiment of the invention mounted in a wheel well of a rim and with the connection of the rim the supporting wheel not being shown.
Figure 2:
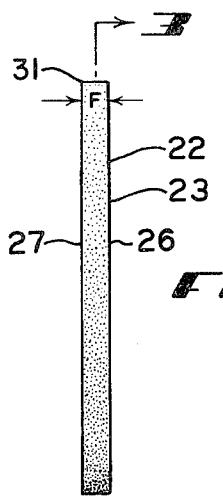
FIG. 2 is an elevation of the elastic wheel well filler ring.

Referring to FIG. 1, a cross section of an annular rim 10 is shown which is mounted on a wheel of a type well known in the art but not shown in this drawing. The rim 10 has a generally cylindrical portion 11 with a first side flange 12 at one side and a second side flange 13 at the other side. A circumferentially extending wheel well 14 is provided in the rim 10 adjcent the first side flange 12 for facilitating mounting of a tire 15. A first bead portion 16 and a second bead portion 17 of the tire 15 are shown mounted in abutting relationship with the first side flange 12 and second side flange 13, respectively. The tire 15 is of a type which is inflatable without a tube and may be of a radial or bias ply construction. As shown in FIG. 1, the first bead portion 16 has a circumferentially extending bead 18 and the second bead portion 17 has a circumferentially extending bead 19 around which plies (not shown) may extend.

A wheel well filler such as elastic flexible ring 22 is adapted for mounting in the wheel well 14. The ring 22 may be circumferentially continuous and be of resilient rubberlike material such as urethane. The ring 22 has a generally rectangular cross section to fit in the circumferentially extending channel of the wheel well 14 in the rim 10. The ring 22 also has a radially outer surface 23, a radially inner surface 24 which is preferably generally concentric with the radially outer surface for seating on a base 25 of the wheel well 14. A first side surface 26 and a second side surface 27 of the ring 22 are generally parallel and connect the radially inner surface 24 to the radially outer surface 23. The first side surface 26 and second side surface 27 are adapted for abutting engagement with radially extending side 28 and 29 of the wheel well 14. Preferably the diameter FD of the ring 22 shown in FIG. 3 in the unstretched condition is smaller than the diameter WD of the wheel well 14, shown in FIG. 1, so that the ring may be stretched over the first side flange 12 and snapped into place in the wheel well.

Figure 3:
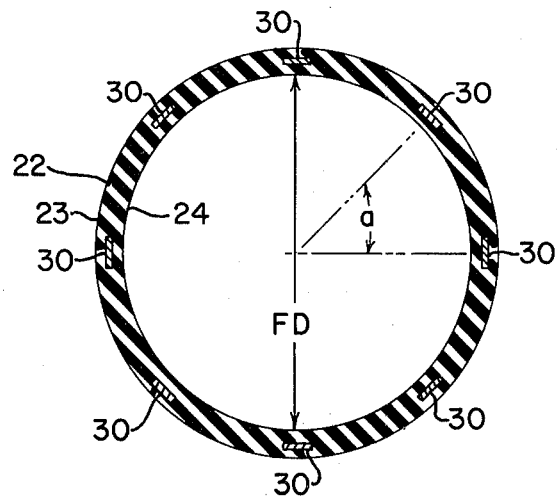
FIG. 3 is a sectional view of the ring taken along the plane of line 3-3 of FIG. 2.
Figure 5:
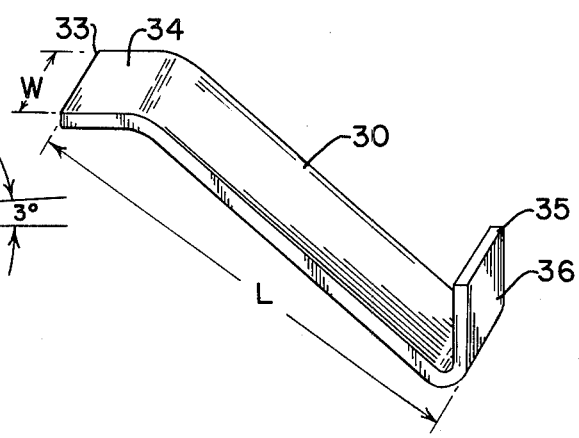
FIG. 5 is an enlarged perspective view showing one of the rigid retainer members.

A plurality of retainer members such as rigid strips 30 of metal or other suitable material are molded in the ring 22 at circumferentially spaced-apart positions around the ring. The strips 30 may be spaced at an angle (a) as shown in FIG. 3 of from 30° to 60° and are spaced at an angle (a) of 45° in the embodiment shown. The strips 30 preferably have a length L greater than the width W, as shown in FIG. 5, and in the present embodiment the length L is approximately six times the width W.

Figure 4:
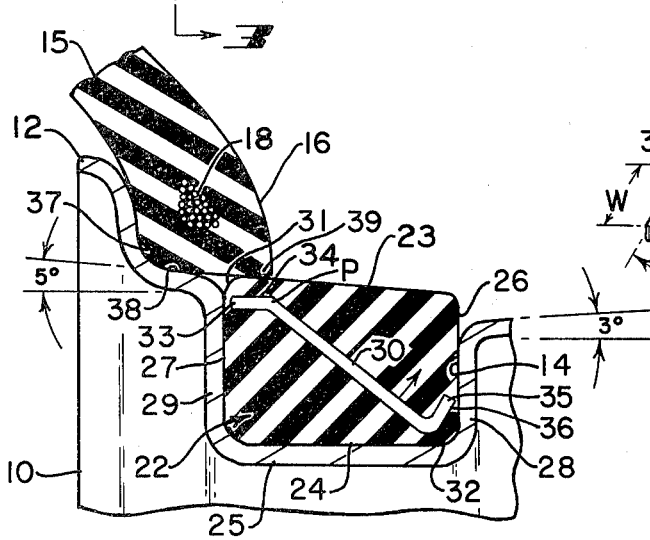
FIG. 4 is an enlarged fragmentary sectional view like FIG. 1 showing the elastic filler ring in greater detail.

As shown in FIG. 4, each of the strips 30 extend from a first position adjacent the radially outer surface 23 and close to an edge 31 where the radially outer surface and second side surface 27 intersect to a second position closer to the radially inner surface 24 and in close proximity to the first side surface 26 and an edge 32 where the first side surface intersects with the radially inner surface. A first end 33 of each of the strips 30 which is located at the first position adjacent the radially outer surface 23 has a flat portion 34 parallel to the radially outer surface. A second end 35 of each of the strips 30 has a bent portion 36 extending radially outward and toward the first side surface 26. Each of the strips 30 extends generally diagonally from a first position close to the edge 31 to a second position close to the edge 32 of the ring 22.

The first bead portion 16 has a heel 37 seated on a bead-seating flange 38 of the rim 10 to provide a register for the heel of the tire bead portion. The bead-seating flange 38 may be tapered for improved seating of the bead portion 16 and in this embodiment the taper is 5 degrees relative to a cylindrical surface of revolution about the axis of the wheel on which the rim 10 is mounted.

The first bead portion 16 also has a toe 39 overlapping the radially outer surface 23 of the ring 22. The radially outer surface 23 of the ring 22 in the installed condition has a diameter equal to the diameter of the bead-seating flange 38 and is tapered at the same 5° angle so that the bead portion 16 with the heel 37 and toe 39 is seated on a surface made up of the tapered surface of the bead-seating flange and the radially outer surface of the rings. The second bead portion 17 is mounted on a second bead-seating flange 42 which may also have a 5° taper in the opposite direction. The cylindrical portion 11 of the rim 10 may have a 3° taper to facilitate mounting of the tire 15.

As shown in FIG. 1, the first bead portion 16 has a width B which is greater than the width S of the bead-seating flange 38 so that the toe 39 will overlap the wheel well filler ring 22 by a distance T. The wheel well 14 has a width F which is substantially the same as the width F of the ring 22 and greater than the width B of the first bead portion 16 to facilitate mounting of the tire 15. As shown in FIG. 4, the edge of the toe 39 overlaps the flat portion 34 of each of the retainer strips 30 and provides an effective pivot P for each of the strips close to the edge of the toe.

The valve for inflating the tire 15 is of a type well known in the art and is connected to the cylindrical portion 11 of the rim 10 with a valve stem extending radially inward and axially outward from the cylindrical portion around the well 14. Preferably, the toe 39 overlaps the ring 22 the distance T which is under one-fourth the width F of the ring. The width S of seating flange 38 is also preferably over one-half the width B of the bead portion 16.

To assemble the ring 22 and tire 15 on the rim 10 as shown in FIGS. 1 and 4, part of the second bead portion 17 of the tire 15 is placed in the wheel well 14 and the rest of the bead portion pulled over the first side flange 12. The second bead portion 17 is then moved out of the well 14 and over the cylindrical portion 11 on the rim 10. Then part of the first bead portion 16 is placed in the well 14 and the rest of the first bead portion pulled over the side flange 12. The first bead portion 16 is then moved over the cylindrical portion 11 of the rim 10 so that the ring 22 can be stretched and pulled over the first side flange 12 into position in the wheel well 14. Finally, the first bead portion 16 and the second bead portion 17 are moved into the seated positions shown in FIGS. 1 and 4 which may be done by spreading the bead portions in a manner well known in the art. Air is then introduced into the tire 15 and the pressure increased to the normal operating pressure for the tire.

In the event of a puncture causing deflation of the tire 15, the ring 22 will prevent the bead portions 16 and 17 from entering the well 14 and therefore insure that the tire will stay on the rim 10.

During operation of the tie 15, the ring 22 will be subject to centrifugal force and due to the resilient nature of the material of the ring, the first side surface 26 will tend to be deflected as the ring is urged radially outward and in a counterclockwise direction around the pivot P as shown by the arrow in FIG. 4. The strips 30 have the rigidity to resist this deflection and thereby prevent the rotation of the ring 22 out of the wheel well 14. The bent portion 36 of each of the strips 30 provides a bearing surface to further resist deflection of the first side surface 26. It can be seen from FIG. 4 that the toe 39 of the bead portion 16 overlaps the edge 31 of the ring 22 which resists movement of that edge radially outward under centrifugal force. The first side surface 26 of the opposite side is in abutting engagement with the side 28 of the wheel well 14 and will tend to deflect as the centrifugal force causes movement in the direction of the arrow shown in FIG. 4. The strips 30 which have an effective pivot point P will resist this deflection and the sides 28 and 29 of the wheel well will hold the ring 22 in place.

In the event it is desirable to remove the tire 15 from the rim 10, it is only necessary to deflate the tire and then move the first bead portion 16 over the cylindrical portion 11 of the rim. The ring 22 may then be removed by stretching it over the first side flange 12 of rim 10 opening up the wheel well 14 for movement of the bead portions 16 and 17 into the well and over the first side flange until the tire 15 is removed from the rim.

It is understood that while the ring 22 is shown with strips 30 to prevent rotation of the ring under centrifugal force to illustrate the invention, it will be apparent to those skilled in the art that various changes and other modifications may be made therein without departing from the invention.

What is claimed is:

1. In combination, a wheel rim for mounting a tire of the type having a bead portion with a circumferentially extending bead, said rim having a generally cylindrical portion, a side flange on one side of said rim, a circumferentially extending wheel well in said generally cylindrical portion adjacent said side flange, said wheel well having an axial width greater than the width of said bead portion and being spaced from said side flange a distance less than the width of said bead portion providing a bead seating flange adjacent said side flange so that said bead portion will extend over a portion of said well, a wheel well filler for mounting in said wheel well comprising a flexible ring having a radially outer surface, a radially inner surface for seating in the bottom of said well, a side surface connecting said inner and outer surfaces and abutting a side of said well spaced from said bead seating flange, a plurality of rigid retainer members located in said ring at circumferentially spaced-apart positions, each of said retainer members extending from a first position under said bead spaced from said side surface and adjacent said bead seating flange of said rim to a second position closer to said radially inner surface and in close proximity to said side surface of said ring and to said side of said well so that said bead portion will overlap the end of each of said retainer members at said first portion and the retainer members will limit deflection of said ring at said side surface by said side of said well to prevent rotation of said ring out of said wheel well when subjected to centrifugal force.

2. The combination of claim 1 wherein said filler is a continuous elastic flexible ring and has a circumference in the unstressed condition less than the circumference of said rim at the bottom of said well for mounting of said ring in said well under tension.

3. The combination of claim 1 wherein said retainer members are of metal and molded in said flexible ring.

4. The combination of claim 1 wherein said end of each of said retainer members at said first position under said bead portion has a portion parallel to said radially outer surface extending from said first position away from said side surface to provide an effective pivot for each of said retainer members which is close to the edge of the toe of said tire bead portion for increased resistance to deflection of said side surface.

5. The combination of claim 1 wherein said end of each of said retainer members at said second position has a bent portion extending radially outward and toward said side surface to provide an increased bearing surface for resisting deflection of said side surface of said ring between said bent portion and said side of said well.

6. The combination of claim 1 wherein said retainer members are positioned at circumferentially spaced-apart positions at angles of from 30 to 60 degrees around said ring.

7. The combination of claim 1 wherein said flexible ring is of urethane.

8. The combination of claim 1 wherein each of said retainer members has a length equal to or greater than six times the width of the retainer member.

9. The combination of claim 1 wherein said bottom of said well is axially extending, said side of said well is radially extending, said ring has a generally rectangular cross section with said radially inner and outer surfaces being generally concentric, and each of said retainer members extends diagonally from said first position to said second position.

* * * * *

UNITED STATES PATENT AND TRADEMARK OFFICE
CERTIFICATE OF CORRECTION

PATENT NO. : 4,076,067
DATED : February 28, 1978
INVENTOR(S) : Michael L. Gill

It is certified that error appears in the above-identified patent and that said Letters Patent are hereby corrected as shown below:

Column 2, line 38:

"adjcent" should read --adjacent--

Column 5, line 16:

"portion" should read --position--

Signed and Sealed this

Nineteenth Day of May 1981

[SEAL]

Attest:

RENE D. TEGTMEYER

Attesting Officer

Acting Commissioner of Patents and Trademarks